US007019257B2

(12) United States Patent
Stevens

(10) Patent No.: US 7,019,257 B2
(45) Date of Patent: Mar. 28, 2006

(54) LASER DRILLING SHAPED HOLES

(75) Inventor: Martin J Stevens, Bristol (GB)

(73) Assignee: Rolls-Royce plc, London (GB)

( * ) Notice: Subject to any disclaimer, the term of this patent is extended or adjusted under 35 U.S.C. 154(b) by 127 days.

(21) Appl. No.: 10/687,885

(22) Filed: Oct. 20, 2003

(65) Prior Publication Data

US 2004/0094524 A1 May 20, 2004

(30) Foreign Application Priority Data

Nov. 15, 2002 (GB) .................................. 0226689

(51) Int. Cl.
*B23K 26/00* (2006.01)

(52) U.S. Cl. ............................ 219/121.71; 219/121.7; 219/121.85

(58) Field of Classification Search ........... 219/121.71, 219/121.7, 121.85, 121.6, 121.78, 121.82
See application file for complete search history.

(56) References Cited

U.S. PATENT DOCUMENTS

| | | | | |
|---|---|---|---|---|
| 4,762,464 | A * | 8/1988 | Vertz et al. | 416/97 R |
| 4,808,785 | A * | 2/1989 | Vertz et al. | 219/69.17 |
| 5,605,639 | A * | 2/1997 | Banks et al. | 219/69.17 |
| 5,609,779 | A | 3/1997 | Crow et al. | |
| 5,739,502 | A * | 4/1998 | Anderson et al. | 219/121.71 |
| 6,307,175 | B1 * | 10/2001 | Blochlinger et al. | 219/121.71 |
| 6,420,677 | B1 * | 7/2002 | Emer et al. | 219/121.71 |
| 6,630,645 | B1 * | 10/2003 | Richter et al. | 219/121.71 |
| 6,781,091 | B1 * | 8/2004 | Byrd et al. | 219/121.71 |

FOREIGN PATENT DOCUMENTS

WO WO 00/09884 2/2000

* cited by examiner

*Primary Examiner*—M. Alexandra Elve
(74) *Attorney, Agent, or Firm*—Oliff & Berridge, PLC

(57) ABSTRACT

A method of laser trepan drilling diffuser type holes in a component which comprises directing the beam of the laser such that it drills a diffuser section on the beam entry side of the hole with the beam exiting the hole without interfering with the remaining non-diffuser part of the hole.

15 Claims, 3 Drawing Sheets

LASER DRILLING SHAPED HOLES

This invention relates to a method for drilling shaped holes in a structure and in particular concerns a method of laser drilling diffuser type cooling holes in a gas turbine engine component such as a nozzle guide vane.

Cooling holes are produced in nozzle guide vanes (NGV's) using both laser and electrical discharge machining (EDM) methods. Cooling holes are formed in the airfoil wall sections of an NGV to enable cooling air bled from the engine compressor, for example, to pass from the hollow core of the NGV to form a thin film of cooling air over the airfoil surface, thereby protecting the airfoil from the effects of high temperature combustion gases. Film cooling is necessary to prevent the combustion gases, which may exceed 1600° C. in modern high performance engines, from melting the NGV's at the turbine inlet. A secondary effect of the introduction of film cooling air is to dilute the combustion gases and thereby reduce the mean temperature of the gases exiting the NGV's so that the turbine rotor blades downstream of the NGV's operate in a less hostile (ie lower temperature) environment.

The shape and size of cooling holes varies considerably depending on the shape and size of the component to be cooled and the amount of cooling air required in a specific area of the airfoil. The geometric shape of cooling holes includes cylindrical holes and shaped holes. Cylindrical holes typically comprise a constant area circular cross-section passing through the wall of the airfoil. These holes are relatively easy to produce using known EDM and laser technologies. Shaped holes, on the other hand are more difficult to produce and typically comprise a constant cross-section metering section for controlling the amount of cooling air flowing through the hole, and a downstream diffuser section opening onto the exterior surface of the airfoil. The purpose of the diffuser is to reduce the flow velocity of the cooling air as it passes through the hole so that it can readily form a thin film over the surface of the airfoil when exiting the hole. Shaped cooling hole geometries include race track holes, two or three into one, conical diffuser holes and two dimensional Y-shaped "plain fan" or "EDM fan" type holes. For the purpose of this description the term "EDM fan" refers to a shaped diffuser type cooling hole having a generally cylindrical upstream metering section which opens to a generally two dimensional fan shaped diffuser section such that the hole has an overall Y-shaped configuration. The "EDM fan", or term "plain fan" which is used interchangeably herein, is used to describe this type of cooling because hitherto it has only been possible to produce this geometry by EDM drilling.

A current production method for generating EDM or plain fan cooling holes in NGV's involves the oscillation of a set of EDM electrodes to erode (by spark erosion) the component material. The amplitude of the oscillation is reduced as the depth of the hole increases so that an angled fan is generated. When the electrode reaches the transition point between the fan and the metering section oscillation of the electrode ceases and a constant cross-section cylindrical hole is produced. The cylindrical hole has a cross-section determined by the geometry of the electrode.

There are a number of disadvantages associated with the use of EDM methods to drill diffuser type cooling holes. For example, the cost of EDM tooling can be expensive, particularly since a separate tool is required for each row of cooling holes to be drilled. The shape, size and distribution of the holes in each row is usually different to that of other rows and therefore the same EDM tooling cannot be used for different rows. In addition, the cost of the consumable brass or tungsten electrodes can be significant since twenty five or so may be used for a particular row of holes and these may need replacing after they have been used for drilling only a few components. The EDM drilling process is also relatively slow when compared with, say, laser drilling. There is a general requirement therefore to decrease the time it takes to drill a hole particularly since components such as NGV's comprise many tens or hundreds of shaped holes. Another disadvantage of the EDM drilling process is that it only provides for cylindrical type holes at the opening into the interior plenum of the NGV. In some applications there is a requirement to produce a fan type structure at the opening on the interior surface of the wall into the interior plenum of the NGV.

Various earlier published patents describe methods for drilling shaped cooling holes by laser and a combination of laser and EDM drilling steps. For example, U.S. Pat. No. 4,808,785 discloses a two step process including a first step of laser drilling a constant cross-section hole through the wall section of an NGV airfoil and subsequently performing an EDM step to form the diffuser shaped part of the hole. This method has the disadvantage that it requires a highly accurate positioning system to ensure correct positioning of the work piece with respect to the laser drilling apparatus and the EDM electrodes in this two step process.

U.S. Pat. No. 5,418,345 discloses an improved method for ensuring correct alignment of the two parts of the hole formed by the different processes by determining a spatial error between the co-ordinate systems of the two process operations. This earlier published document only provides a partial solution to the problem of forming shaped cooling holes in a quicker and more cost effective way by means of laser drilling.

U.S. Pat. No. 5,609,779 discloses a laser drilling method for forming shaped diffuser type cooling holes in which the diffuser part of the hole is formed by drilling a series of blind circular holes or slots which do not pass completely through the metal component. This earlier document is concerned with the problem of forming a diffuser portion without substantial variation in width, depth and surface contour due to the diffuser being formed by a series of blind bores.

U.S. Pat. No. 5,683,600 discloses a method of laser drilling diffuser type cooling holes in airfoil sections such as NGV's in a single step operation where a rectangular or square cross-section YAG pulsed laser beam is focused below the exterior surface of the airfoil so that the beam first cuts a generally trapezoidal shaped diffuser section followed by a cylindrical section in a single drilling operation. In this process a hole is produced without moving the laser with respect to the component being drilled. The position of the focal point of the beam, that is to say the amount of de-focus, determines the transition point between the diffuser and cylindrical sections. With this method it is suggested that a single laser drilling operation can be conducted in about 3 seconds compared with 15 plus minutes to form the same hole using conventional EDM techniques. One drawback with this particular method however is that it is only suitable for percussion drilling the whole of the cooling hole in a single drilling operation where the size and shape of the hole being drilled is determined by the cross-section of the beam in the plane normal to the direction of the beam propagation and the degree of beam out of focus, as determined by the depth of the focal point from the exterior surface of the airfoil.

Other laser drilling methods are disclosed in U.S. Pat. No. 6,359,254 where the diffuser part of the shaped cooling hole is formed by laser drilling a series of blind bores in the exterior surface of the airfoil, laser drilling a through bore to communicate with the blind bores and finishing the diffuser by milling to provide a smooth surface. U.S. Pat. No. 6,362,446 also discloses a two step process where a laser drill is used for drilling at least one rough blind bore within a turbine airfoil and then removing the remaining material by EDM drilling.

According to a first aspect of the invention there is a method of laser trepan drilling diffuser type shaped holes in a workpiece having an internal cavity, the said method comprising the steps of:

laser drilling a hole of substantially constant cross-section through a wall of the workpiece;

directing the beam of the laser such that the beam follows a path on at least one side of the hole to drill a diffuser section on at least the beam entry side of the hole with the beam exiting the hole substantially without interference with the remaining non-diffuser part of the hole.

The above method readily enables diffuser type cooling holes to be formed in gas turbine engine components such as NGV and turbine rotor blade airfoils having a hollow interior plenum, plenums, or other cooling passages for conveying cooling air to the exterior surface of the airfoil by means of trepanned diffuser type cooling holes. Typically in such components the diffuser section is formed to a depth of about two thirds of the wall thickness of the component with the remaining third being occupied by the constant cross-section non-diffuser part of the hole. Hitherto it has only been possible to drill certain diffuser hole type geometries by single step laser drilling methods such as those disclosed in U.S. Pat. No. 5,683,600 by controlling the beam focus and angle of incidence to form a hole corresponding to the three dimensional shape of the incident and focused beam. The laser trepan drilling method according to the above aspect of the invention readily enables various other geometries to be formed including the so-called "EDM fan" or "plain fan" type of hole which hitherto has only been possible with the aforementioned EDM process. With the trepan drilling method described above the diameter of the laser beam is significantly less than the diameter of the hole being drilled and this readily enables the laser beam to be directed to cut the diffuser section by following a predetermined path to remove the metal from the component without the beam striking the other side of the cooling hole and causing unwanted material removal. A typical beam diameter may be in the region of say 0.2 mm for laser drilling a constant cross-section hole having a diameter of 0.6 mm, with a diffuser angle in the range of say 25–30° in the flow direction.

The above method readily enables individual diffuser type holes to be drilled in a row of holes having different dimensions, such as hole diameter and diffuser angle. This process capability is of significant benefit to the gas turbine engine designer since the method readily enables the design of individual holes to be optimised without the design constraints of designing a whole row of similar shape and size holes for drilling by EDM electrodes.

It is to be understood that the steps of the above mentioned method may be carried out in any order, that is to say, the through hole may be drilled before or after the diffuser section although in preferred embodiments the through hole will be drilled first to provide a more efficient drilling method.

In an embodiment, the diffuser section is cut with a generally elongate opening on the beam entry side of the hole, with the beam being inclined with respect to the longitudinal axis of the cooling hole, and with respect to the elongate axis of the said opening being formed on the beam entry side of the wall such that the beam is directed substantially wholly into the interior of the hole as it passes therethrough. The present inventors have found that for diffuser type cooling holes, in particular "EDM fan" type holes, it is possible to avoid unwanted metal removal by the laser striking the opposite side of the hole when the angled diffuser section is being cut by slightly rotating the laser beam in the plane normal to the longitudinal direction of the hole so that the beam is angled with respect to the elongate axis of the opening being formed, whereby the beam is angled towards the interior of the hole. In the case of an ovoid shaped opening the beam is angled with respect to the straight side of the ovoid as the beam traverses along the straight line thereof.

Preferably, the beam is inclined with respect to the elongate axis of the opening by an angle determined by at least the dimensions of the said opening. In one embodiment the angle is determined by the dimensions of the periphery of the opening, that is the length of the periphery of the opening.

In one embodiment the cooing hole is in the form of an EDM fan type cooling hole. In this respect, the method readily enables EDM fan type cooling holes to be formed by laser drilling. In this way a hole may be drilled in a matter of a few tens of seconds as opposed to tens of minutes as in the case of EDM drilling.

In a preferred embodiment, the non diffuser part of the hole comprises a substantially circular cross-section and the diffuser a substantially ovoid cross-section having a pair of semi circular arcs joined together at their respective ends by a pair of straight parallel sides coincident with the opposite sides of the circular cross-section. Thus, embodiments of the method of the present invention contemplate laser trepan drilling of diffuser type geometries in which the diffuser section is substantially two dimensional, that is in the sense that the cooling hole has a two dimensional substantially rectangular or oval configuration in the plane normal to the longitudinal axis of the hole, rather than say a three dimensional conical or elliptical configuration. This two-dimensional configuration is commonly found in gas turbine engine components such as NGV's. The invention also contemplates cooling hole geometries in which the diffuser is formed on only one side of the constant cross-section hole.

In a preferred embodiment the said angle is determined by the steps of: determining the ratio of the length dimension of the periphery of the said opening and half the length dimension of the opening in the direction of the major axis of the ovoid cross-section; determining a first angle with respect to a minor axis of the said ovoid cross-section by dividing 360 degrees by the said ratio to establish a first position on the periphery of the said circular cross-section, and the step of generating a line between the said first position with a second position on the ovoid at the transition from straight line to circular arc in the quadrant of the arc to be drilled, and determining the angle of the generated line with respect to the major axis of the ovoid. This provides a reliable method for determining the angle the beam should be inclined with respect to the major axis of the opening to avoid the beam striking other parts of the hole, for example the circular cross-section part of the hole previously formed. For the majority of cooling hole geometries the ratio is in the range of 5–7 such that the first angle lies between 50–70° from the minor axis of the periphery of the opening. By generating a line between the transition point on the opening periphery between the straight and circular arc sections in a particular quadrant to be drilled, with the line passing through a point on the circumference of the circular cross-section hole in the same quadrant, the angle of the line with respect to the major axis determines the angle of the beam with respect to the major axis necessary to avoid unwanted metal removal on the opposite side of the hole, for example, in the circular cross-section part at or near the cooling hole opening on the beam exit side of the cooling hole.

Preferably, the beam is rotated with respect to the said major axis as it moves between respective transition points on the arcs such that in the plane of the opening the beam is aligned with the major axis when at the mid point of the respective arcs. In this way it will be understood that the beam undergoes a transition as it follows the semi circular arc portions of the opening periphery such that the angle of inclination with respect to the major axis is reduced until the beam reaches a mid point on the arc where the beam is coincident with the manor axis and then steadily increases to an equal and opposite inclination on the opposite side of the periphery at the transition between the circular arc and the other straight line section.

According to another aspect of the invention there is a method of laser drilling EDM fan type diffuser cooling holes in a gas turbine engine component; the said method comprising the steps of:

- laser drilling a hole of substantially constant cross-section through a wall of the component;
- directing the beam of the laser such that the beam follows a path on at least one side of the hole to drill a diffuser section on at least the beam entry side of the hole with the beam exiting the hole substantially without interference with the remaining non-diffuser part of the hole.

The invention will now be more particularly described, by way of example only, with reference to the accompanying drawings; in which FIG. 1*a* is a plan view of an "EDM fan" diffuser type cooling hole for a gas turbine engine component;

FIG. 1*b* is a cross-section view of the cooling hole of FIG. 1*a* along the major axis thereof indicated by the lines I—I in FIG. 1*a;*

Figure 1A:
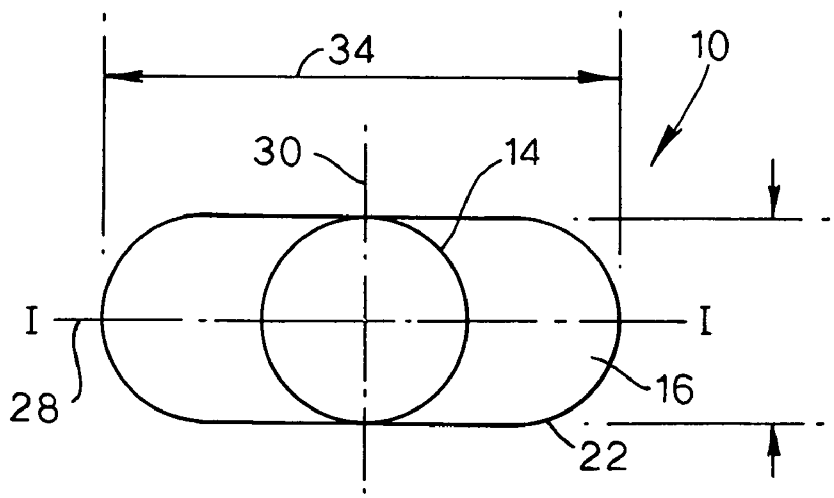
Figure 4A:
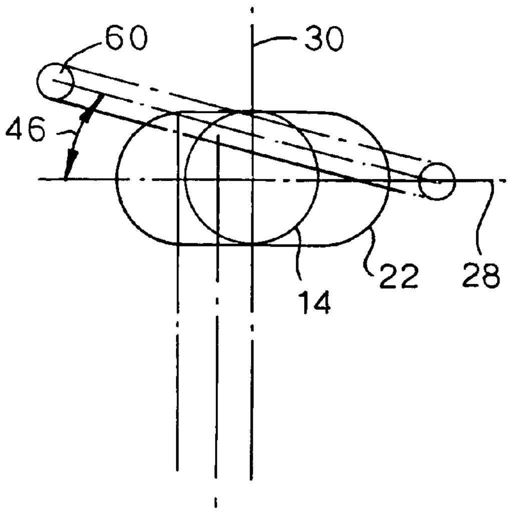
Figure 5A:
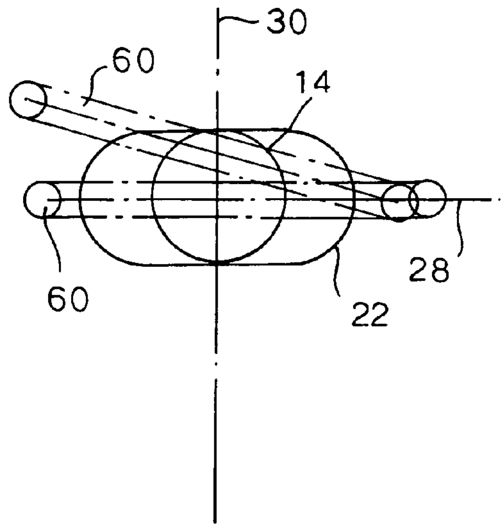
Figure 4B:
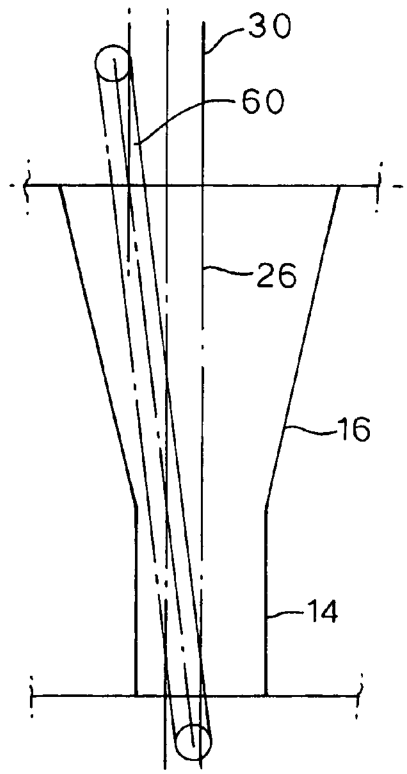
Figure 5B:
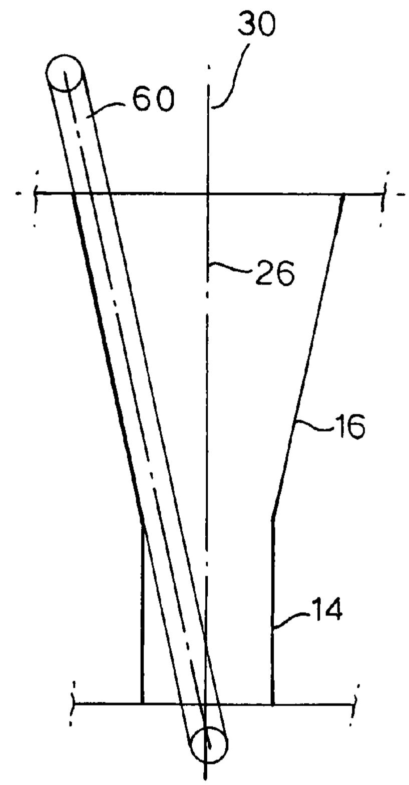

FIG. 4*a* is a plan view similar to FIG. 1 showing the inclination of a laser beam with respect to the opening on the beam entry side of the hole;

FIG. 4*b* is a cross-section view similar to that of FIG. 1*a* showing the beam passing through the hole;

FIG. 5*a* is a view similar to that of FIG. 4*a* showing the extreme positions of the beam when moving from the transition point at the beginning of one of the semi circular arcs to a mid point along that arc coincident with the major axis of the periphery of the opening; and, FIG. 5*b* is a cross-section similar to FIG. 4*b* with the laser beam inclined with respect to the longitudinal axis of the hole and coincident with the major axis of the opening.

Figure 1B:
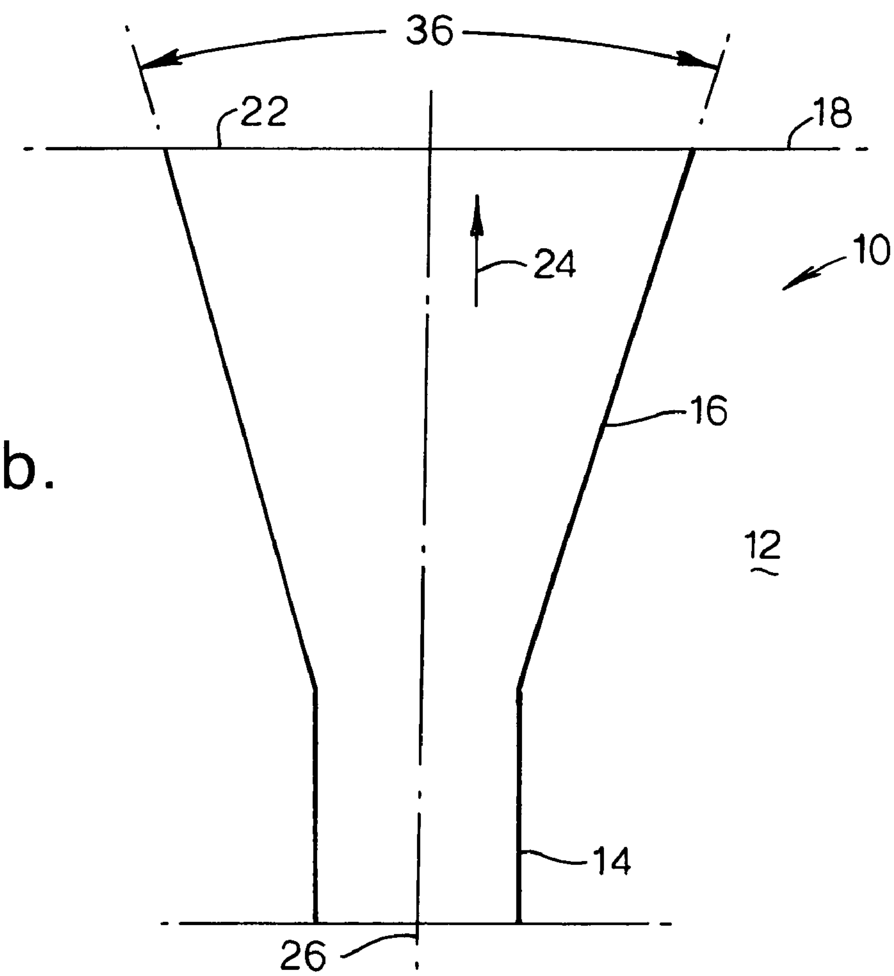

Referring to FIGS. 1*a* and 1*b*, a diffuser type shaped cooling hole in the form of an "EDM fan" or "Plain fan" suitable for a gas turbine engine component such as an NGV or the like is indicated at 10. For the purpose of the following description the cooling hole 10 will be described as formed in the airfoil wall section of a hollow NGV having an interior plenum or cooling passage in the interior of the vane. It is to be understood that many similar cooling holes may be provided in one or more rows in an NGV or other gas turbine engine component. Typically such components are manufactured from high temperature Nickel alloys.

In FIGS. 1*a* and 1*b* the cooling hole 10 is formed in the wall 12 of an NGV airfoil by an embodiment of the laser drilling method of the present invention. The cooling hole 10 comprises a circular and substantially constant cross-section metering section 14 and a diffuser section 16 which extends from the cylindrical metering hole part 14 to the exterior surface 18 of the NGV airfoil section. The metering section controls the amount of cooling air entering the hole from the hollow interior 20 of the vane, and the diffuser section 16 reduces the velocity of the cooling air before it passes through the opening 22 on the exterior surface 18 of the airfoil. In the drawing of FIG. 1*b* the direction of the cooling fluid through the hole is indicated by the arrow 24.

As can be seen in FIG. 1*a*, the cooling hole has a generally oval shape cross-section in the plane normal to the longitudinal or flow axis 26 of the hole. In the embodiment shown the oval cross-section is symmetrical about its respective major and minor axes 28 and 30. Typical dimensions for the cooling hole of FIGS. 1*a* and 1*b* are 0.76 mm diameter with a length of 1.6 mm, that is to say the distance between the ends of the elongate cross-section as indicated by the dimension at 34 in the drawing of FIG. 1*a*, and an inclusive diffuser angle of 25 degrees as indicated by the angle 36 in the drawing of FIG. 1*b*.

Figure 2:
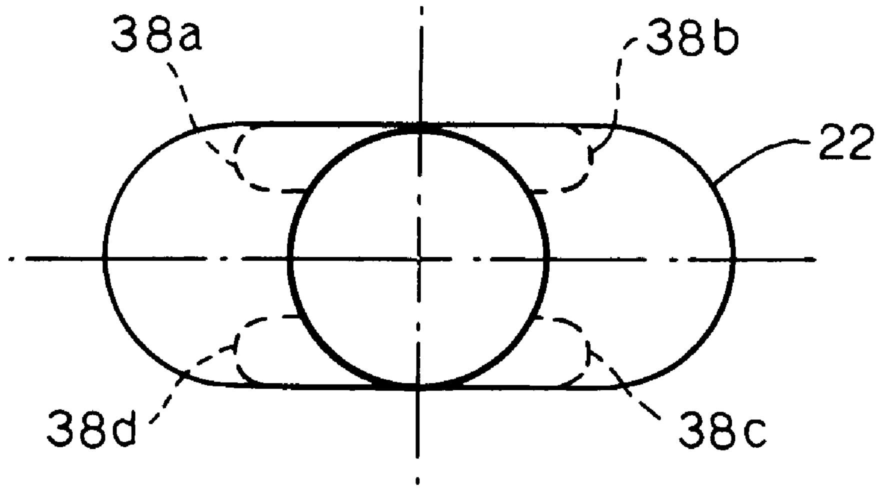
FIG. 2 is a plan view similar to that of FIG. 1*a* of a mis-shapen hole formed by a laser drilling process where the beam is not inclined with respect to the major axis of the opening on the beam entry side of the component being drilled.
Figure 3:
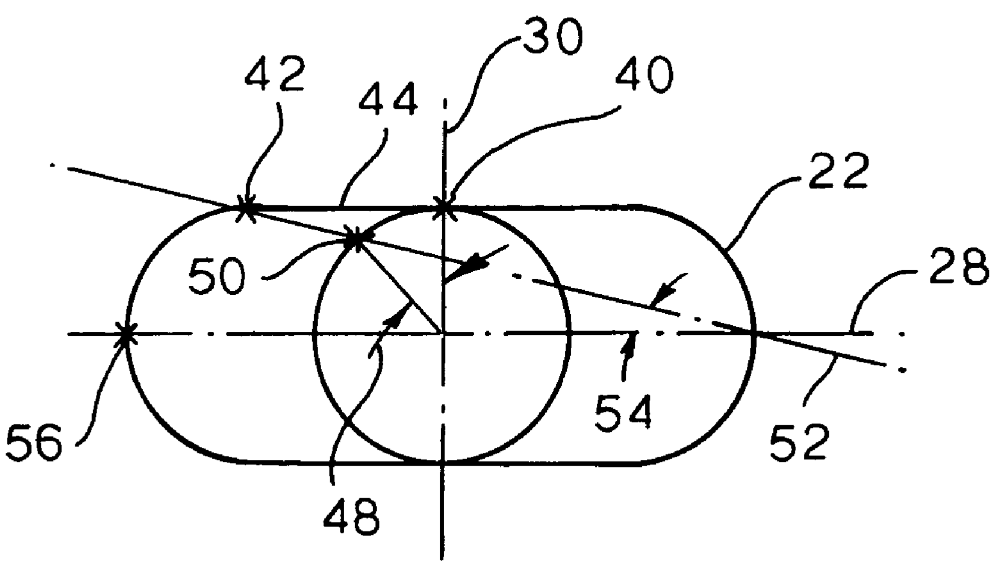
FIG. 3 is a plan view similar to that of FIG. 1*a* and FIG. 2 for a typical "EDM style fan" cooling hole identifying various points on the periphery of the opening that are significant in the implementation of the present invention.

Referring now to FIG. 2, previous attempts to laser drill EDM and style cooling holes of the type shown in FIGS. 1*a* and 1*b* have lead to mis-shapen holes similar to that shown in FIG. 2. The angle of inclination of the laser beam required to form the angled diffuser has in previous methods caused material to be removed from the opposite side of the hole in the region of the beam exit as indicated by the chained lines 38 in the drawing of FIG. 2, for example. In order to form a diffuser having an inclusive angle of 25 degrees it is necessary to rotate the laser beam through 12.5 degrees with respect to the longitudinal axis 26 such that when the region of the diffuser in the upper left hand quadrant is formed, as shown in the drawing of FIG. 2, the laser beam causes material to be removed as indicated by line 38*b* on the other side of the hole (upper right hand quadrant) in the region of the constant cross-section metering cylinder section 14. This problem is overcome in embodiments of the present invention by rotating the laser beam away from the edge of the hole being drilled towards the centre of the hole as the beam moves from position 40 to the transition point 42 along the straight edge section 44 of the opening in the quadrant being formed, as indicated in FIG. 3.

The undercut regions 38 shown in FIG. 2 are avoided in embodiments of the invention as shown in FIGS. 4*a* and 4*b* by rotating the laser beam in the plane normal to the longitudinal axis 26 so that the beam is directed away from the circumference of the circular section hole towards its centre so that the beam does not damage the opposite sides of the hole. As can be seen in FIG. 4*a* the beam is rotated so that it forms an angle 46 with respect to the major axis 28 of the oval shaped cross-section opening being formed. The precise value of the angle 46 is determined by a geometrical method which involves the step of calculating the ratio of the length of the periphery of the oval opening and half the length dimension 34 of the opening. This ratio for a typical EDM style fan cooling hole is typically in the range of 5–7. This ratio is then used to calculate a sector angle as indicated at 48 in FIG. 3 which is the angle measured from the minor axis 30. The sector angle 48 is determined by dividing a full revolution (360 degrees) by the ratio. For example, if the cooling hole geometry has a ratio of 6 the angle 48 is 60 degrees. The point on the circular cross-section corresponding to this angle, that is to say, point 50 in the drawing shown in FIG. 3, defines a first position on a line which passes through a second position 42 at the transition between the straight and curved section of the diffuser opening periphery. A straight line 52 through the points 42 and 50 forms an angle 54 with the major axis 28 of the oval shaped opening and this defines the angle of rotation 46 of the beam with respect to the major axis that is necessary to ensure the beam exits the cooling hole through the circular cross-section on the beam exit side of the wall without striking the surfaces of the hole as in FIG. 2.

In the one method of the present invention the beam 60 first trepans the circular cross-section 14 made by following the line of the hole circumference and then trepans the diffuser. The beam traverses along the outline of the diffuser from the point 40 to the transition point 42 with the beam inclined with respect to the axis 26 in accordance with the diffuser angle to be formed, and also with respect to major axis 28 by an amount equal to the angle 54 as determined for the geometry of the particular shaped cooling hole to be drilled. The laser beam traverses along the straight section of the diffuser between the points 40 and 42 and then progressively moves from the position shown in FIG. 4*a* to that shown in FIG. 5*a* where the beam is substantially aligned with the major axis of the oval shaped opening in the plane normal to the flow axis 26. The transition between the points 42 and 56 at the mid point of the semi circular arc is completed by implementing a circular interpolation routine rotating the beam in the plane normal to the longitudinal axis 26. The beam then follows the outline of the oval opening through the remaining quadrants defined by the axes 28 and 30. In one embodiment the laser beam is under the control of a 5 axis (three translational and two rotational axes) numerically controlled laser drilling machine and the laser beam comprises a pulsed YAG laser having a pulse rate of 30 Hz.

Although aspects of the invention have been described with reference to the embodiments shown in the accompanying drawings, it is to be understood that the invention is not limited to these precise embodiments and that various changes and modification may be effected without further inventive skill and effort. For example the shaped cooling holes produced by the method disclosed herein may be formed in other gas turbine engine components which utilise film cooling, for example combustion chambers and the like. In addition the shaped cooling holes may be formed in other structures where diffuser shaped holes are required and therefore the invention contemplates applications in fields other than the manufacture of gas turbine engine components. The invention also contemplates a method of forming diffuser shaped holes where the diffuser section is formed wholly or substantially wholly on one side of the cross-section of the constant cross-section hole 14. The invention also contemplates embodiments where a diffuser shaped part is formed on both sides of the hole, that is to say on the vane interior side of the hole in addition to exterior side opening on to the airfoil surface. In embodiments of this type the diffuser section on the interior side of the vane may have substantially the same dimensions as the diffuser section on the exterior side as shown in the accompanying drawings, or alternatively the diffuser sections may have different dimensions with the diffuser section on the exterior side of the vane being significantly greater than the diffuser on the interior side thereof.

The invention claimed is:

1. A method of laser trepan drilling diffuser type holes in a workpiece having a wall defining an internal cavity, the method comprising:

laser drilling a hole of substantially constant cross-section through a wall of the workpiece, the laser drilling using a beam of a laser; and directing the beam of the laser such that the beam follows a path on at least one side of the hole to drill a diffuser section on at least a beam entry side of the hole with the beam exiting the hole substantially without interference with a remaining non-diffuser part of the hole, wherein the diffuser section is cut with a generally elongate opening on the beam entry side of the hole, with the beam being inclined with respect to a longitudinal axis of the hole, and with the beam being inclined with respect to an elongate axis of the opening being formed on the beam entry side of the wall such that the beam is directed substantially wholly into an interior of the hole as the beam passes therethrough.

2. A method as claimed in claim 1, wherein the beam is inclined with respect to the elongate axis of the opening by an angle determined by at least dimensions of the opening.

3. A method as claimed in claim 2, wherein the angle is determined by dimensions of a periphery of the opening.

4. A method as claimed in claim 1 wherein the hole is in the form of an EDM fan type cooling hole in a gas turbine engine component.

5. A method as claimed in claim 3, wherein the non-diffuser part of the hole comprises a substantially circular cross-section and the diffuser section of the hole comprises a substantially ovoid cross-section having a pair of semi-circular arcs joined together at their respective ends by a pair of straight parallel sides coincident with opposite sides of the circular cross-section.

6. A method as claimed in claim 5 wherein the angle is determined by:

determining a ratio of a length dimension of the periphery of the opening and half the length dimension of the opening in a direction of a major axis of the ovoid cross-section;

determining a first angle with respect to a minor axis of the ovoid cross-section by dividing 360 degrees by the ratio to establish a first position on a periphery of the circular cross-section;

generating a line between the first position with a second position on the ovoid cross-section at a transition from straight line to circular arc in a quadrant of each arc to be drilled; and determining an angle of the generated line with respect to the major axis of the ovoid cross-section.

7. A method as claimed in claim 6, wherein the beam is rotated with respect to the major axis as the beam moves between respective transition points on the arcs such that in a plane of the opening the beam is aligned with the major axis when at a mid point of the respective arcs.

8. A method as claimed in claim 1, wherein the diffuser angle is between 20–30°.

9. A method as claimed in claim 1 wherein a ratio of a length of the diffuser section to the non-diffuser section is approximately 2:1.

10. A method as claimed in claim 1, further comprising directing the beam to cut a further diffuser section on a beam exit side of the hole.

11. A method as claimed in claim 1, wherein the workpiece is a gas turbine engine component.

12. A method as claimed in claim 11, wherein the component comprises an NGV.

13. A method of laser drilling EDM fan type diffuser cooling holes in a gas turbine engine component, the method comprising:

laser drilling a hole of substantially constant cross-section through a wall of the component, the laser drilling using a beam of a laser; and directing the beam of the laser such that the beam follows a path on at least one side of the hole to drill a diffuser section on at least a beam entry side of the hole with the beam exiting the hole substantially without interference with the remaining non-diffuser part of the hole, wherein the diffuser section is cut with a generally elongate opening on the beam entry side of the hole, with the beam being inclined with respect to a longitudinal axis of the hole, and with the beam being inclined with respect to an elongate axis of the opening being formed on the beam entry side of the wall such that the beam is directed substantially wholly into an interior of the hole as the beam passes therethrough.

14. A gas turbine engine component having at least one cooling hole produced directly or indirectly by the method according to claim 1.

15. A method as claimed in claim 8, wherein the diffuser angle is between 25–29°.

* * * * *